United States Patent [19]
Murray

[11] Patent Number: 5,099,772
[45] Date of Patent: Mar. 31, 1992

[54] SEED PLANTING METHOD AND APPARATUS

[75] Inventor: Robert Murray, Los Angeles, Calif.

[73] Assignee: Storybook Garden, Inc., Beverly Hills, Calif.

[21] Appl. No.: 479,783

[22] Filed: Feb. 13, 1990

[51] Int. Cl.⁵ .................................................. A01C 5/02
[52] U.S. Cl. ....................................... 111/92; 111/99; 111/900; 111/199; 47/56
[58] Field of Search .............. 111/72, 82, 92, 89, 111/99, 200, 900, 199; 47/1.01, 9, 56; 40/645; 283/79, 81, 74; 206/459

[56] References Cited

U.S. PATENT DOCUMENTS

| | | | |
|---|---|---|---|
| D. 161,913 | 2/1951 | Fraim | 111/99 X |
| D. 280,882 | 10/1985 | Rea | 47/56 X |
| 1,954,424 | 4/1934 | Otwell | 47/9 |
| 1,983,815 | 12/1934 | Schmiett | 40/645 X |
| 2,865,315 | 12/1958 | Goldstein | 111/92 |
| 4,275,672 | 6/1981 | Clad | 111/99 |
| 4,534,125 | 8/1985 | Buck | 40/645 |

FOREIGN PATENT DOCUMENTS

| | | | |
|---|---|---|---|
| 2519423 | 7/1983 | France | 111/200 |
| 566893 | 1/1945 | United Kingdom | 417/56 |

Primary Examiner—Dennis L. Taylor
Assistant Examiner—Jeffrey L. Thompson
Attorney, Agent, or Firm—Gregory B. Woood; Rehwald Rameson

[57] ABSTRACT

An apparatus and a method are provided for planting seeds with a marked dibble, a marked seed spacer and a marker row spacer. Corresponding markings on a dibble, a seed spacer and a row spacer define the ideal planting depth, seed spacing and row spacing for seed types. Seed spacing is achieved by extending the seed spacer between juxtaposed corresponding markings on the row spacer and creating a hole in the garden soil at a point determined by additional corresponding markings on the seed spacer. Hole depth is determined by further corresponding markings on the dibble.

9 Claims, 2 Drawing Sheets

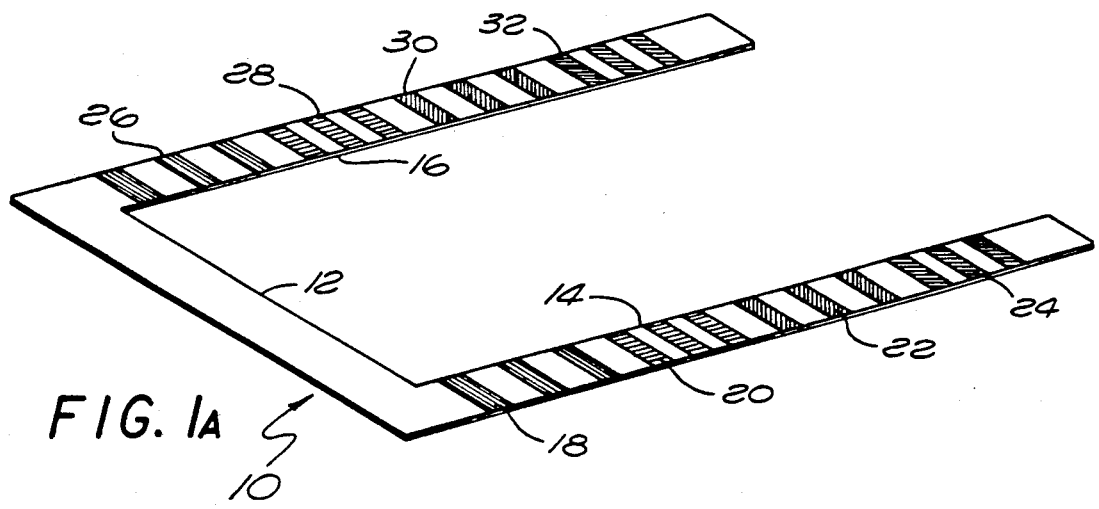
FIG. 1A
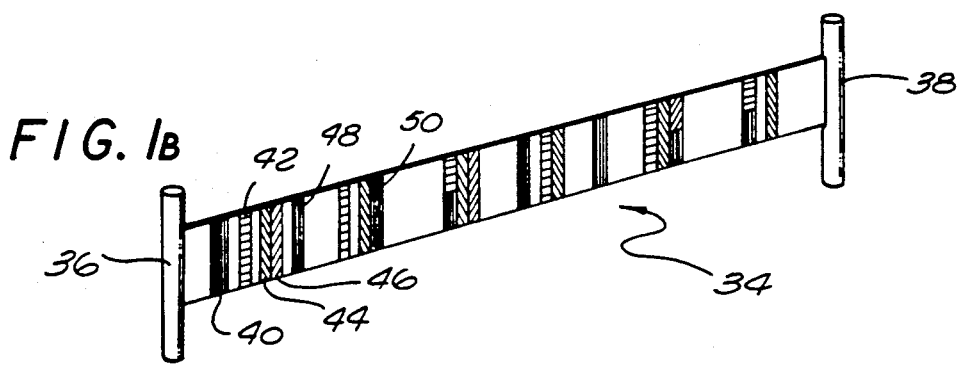
FIG. 1B
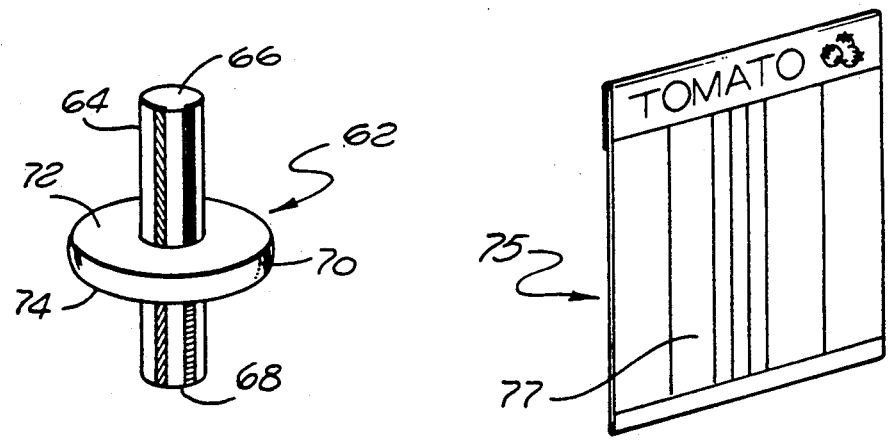
FIG. 1C
FIG. 1D

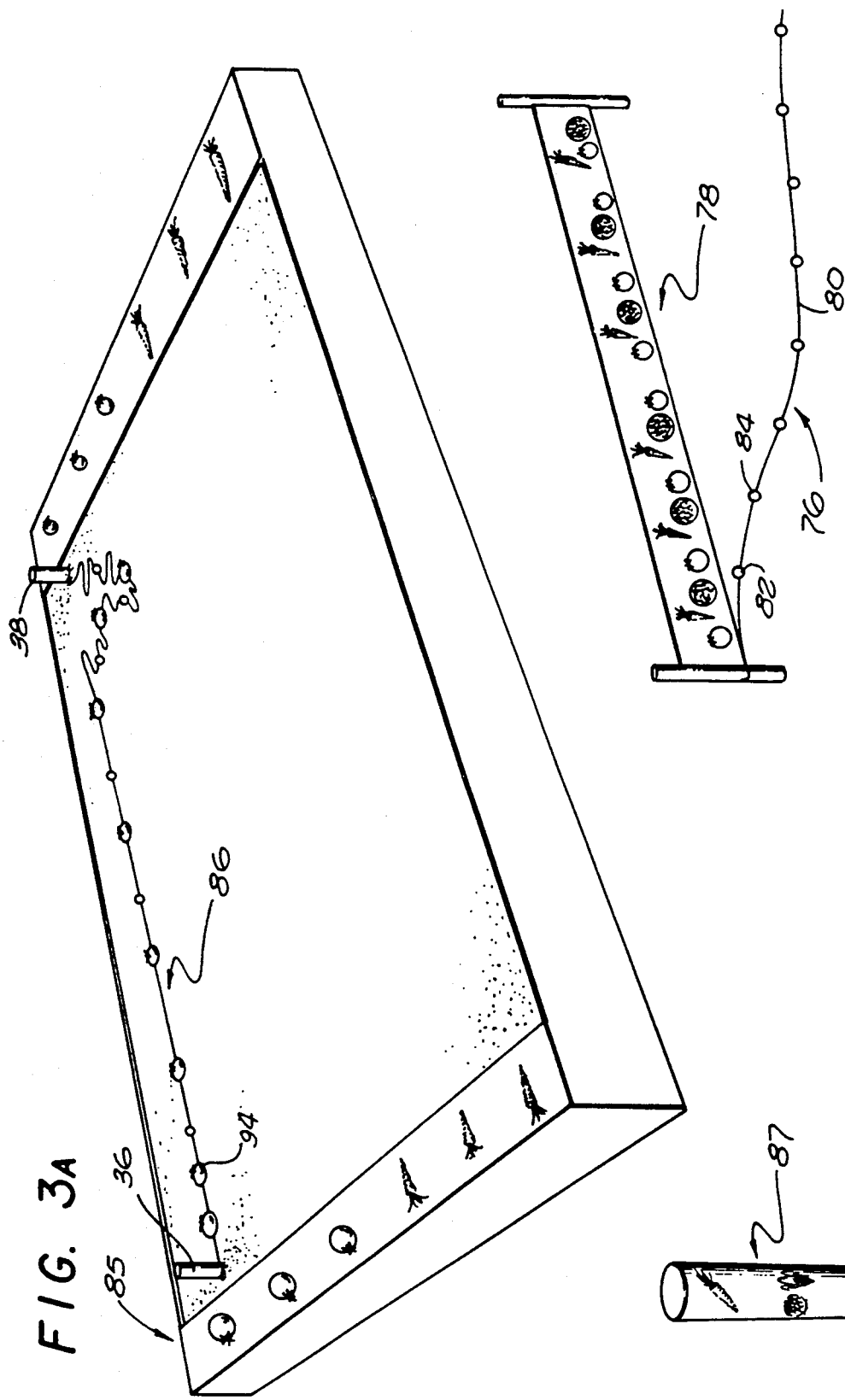

SEED PLANTING METHOD AND APPARATUS

FIELD OF THE INVENTION

The present invention relates generally to seed spacing devices and seed planting methods.

BACKGROUND OF THE INVENTION

Success in cultivation of a home gardens can be greatly increased by planting different seeds at their optimum seed spacing and seed depth. An apparatus which can accurately and easily mark seed spacing, planting depth and, optionally, row spacing is therefore desired.

Most home gardens include several types of seeds which are planted within a small area. Accordingly, a compact apparatus is desired which is capable of marking the optimum spacing and seed depth for a variety of seed types.

A home garden may be planted by adults or young children. An apparatus and method for teaching young children to plant a garden should incorporate simple tools appropriate for young children, as well as a planting system which is easily understood and executed.

U.S. Pat. No. 4,442,627 issued to Adams, et al. discloses a seed planting device constucted of a flat strip pointed at one end with a seed mounted on the underside of a tonque bent outwardly from the plane of the strip. This device provides an apparatus to plant one seed at a desired depth. However, the Jenkins device provides no guidance for accurately determining the spacing between seed rows or seed spacing within a row. Further, the device cannot plant more than one type of seed. Nor can the depth of the seed hole be varied for different type of seeds.

Other devices, such as that disclosed in U.S. Pat. No. 4,738,208, issued to Nockleby, includes a more complex apparatus which furrows, plants and covers a seed bed, while simultaneously providing visual markings which identify the seeded portions of the bed. To change the planting depth, the user must adjust a plow blade to the desired planting depth for one type of seed. Then the apparatus must be adjusted to feed the seeds into the seed chute at a predetermined rate which controls seed spacing within a row. Thus, these complex apparatuses lack flexibility and cannot be used to plant more than one type of seed at a time. Additionally, the size of the apparatuses diminishes their adaptability for planting a home garden with a variety of types of seeds within an area as small as several square feet.

SUMMARY OF THE INVENTION

The present invention includes a flexible apparatus capable of spacing and planting several types of seeds. The apparatus provides for accurate determination of seed row spacing, seed spacing within each row and planting depth for different types of seeds within a small area. Geometric or colored markings are used consistently throughout the elements of the apparatus to indicate the precise spacing and depth for planting different types of seeds. Thus, carrot, lettuce, corn and cherry tomato seeds may be quickly and accurately planted in a single garden.

The present invention is particularly suited for teaching small children how to plant and cultivate a home garden. Simple tools are incorporated which may be safely used by children. The simplicity of the invention allows children to easily regulate seed row spacing, seed spacing within each row and planting depth.

Several types of seeds may be planted with one dibble and row spacing is quickly altered by shifting a seed spacer between markings on a row spacer. Corresponding markings on the dibble, an optional row spacer, and seed spacer for a single seed type, such as cherry tomato seeds, allow children to easily match markings on the seed spacer with corresponding markings on the row spacer and dibble for information on cherry tomato seed row spacing, seed spacing within each row and planting depth. The addition of seed packaging with markings corresponding to the dibble, seed spacer and row spacer markings provides a complete unit for creating a home garden.

Specifically, the present invention comprises a dibble having markings for identifying particular types of seeds. The markings are located a spaced distance from the first end of the dibble corresponding to the preferred depth at which each type of seed is to be planted. Also included is a seed spacing means having markings matching the markings on the dibble and thereby indicating the locations within a row at which each particular type of seed is to be planted. The markings on the seed spacing means thus have characteristics corresponding to the characteristics of the markings on the dibble.

In an alternative embodiment, a row spacing means having markings is incorporated. The row spacing means markings are used in conjunction with the seed spacing means for determining the spacing between rows as well as to define the type of seed to be planted within each row. Additionally, the characteristics of the markings on the row spacing means correspond to the seed type identifying characteristics of the markings on the dibble.

The method of the present invention is also suitable for home gardens with a variety of seed types and as a teaching tool for children. The consistent use of matching markings on seed packaging and on each tool for each type of seed simplifies the instructions a child must follow to plant a home garden. The determination of row spacing is reduced to a simple act of placing the ends of the seed spacer next to matching juxtaposed markings on the row spacer. The determination of seed spacing is accomplished by placing the dibble next to corresponding markings on the seed spacer.

Specifically, the method of the present invention comprises a method of planting seeds in soil with a marked dibble, a marked seed spacing means and a marked row spacing means, the seed spacing means having two ends, and matching dibble markings, seed spacing means markings and row spacing means markings corresponding to a particular type of seed. The method includes the steps of first determining seed row spacing by placing one end of the seed spacing means adjacent to a first marking on one side of the row spacing means and the other end of the seed spacing means adjacent to a matching second marking juxtaposed opposite the first marking on the other side of the row spacing means. Seed spacing is then determined by placing a seed on the soil adjacent to a matching marking on the seed spacing means. Finally, the dibble is pushed into the soil to a depth determined by a matching marking on the dibble. A seed is then placed in the resulting hole and covered.

For example, in one embodiment, a row spacer is placed on the soil with, for example, red circle markings representing cherry tomatoes, facing upwards. A child places one end of the seed spacer adjacent to one red circle on the row spacer and the other end of the seed spacer adjacent to a second red circle juxtaposed on the other side of the row spacer. Next, the child creates a hole in the soil to the depth of a red circle on the dibble next to every red circle on the seed spacer. Finally, the child removes cherry tomato seeds from the package with the red circle marking and places them in the holes and then covers the seeds. Thus, a straight row of cherry tomato seeds is planted with seed spacing determined by the spacing between red circles on the seed spacer.

The next row of cherry tomato seed is planted in the same method after moving the seed spacer so that it is adjacent to the second pair of red circles on the row spacer. Thus, by easily matching red circles on seed packets, dibble, seed spacer and row spacer, a child can plant rows of cherry tomatoes at the proper spacing and depth.

BRIEF DESCRIPTION OF THE DRAWINGS

These and other features of the present invention may be more fully understood from the following detailed description, taken together with the accompanying drawings, wherein similar reference characters refer to similar elements throughout and in which:

FIGS. 1A-1D are perspective views of a row spacer, a seed spacer, a dibble and a seed package with corresponding colored strip markings;

FIG. 2 is a perspective view of a seed spacer with geometric figure markings and a seed strip affixed thereon; and FIGS. 3A and 3B are perspective views of a rectangular soil container row spacer, a seed strip/spacer and a dibble with corresponding geometric figure markings.

DESCRIPTION OF THE ILLUSTRATIVE EMBODIMENT

Referring to FIG. 1, a preferred embodiment of the apparatus constructed according to the present invention for seed planting may have a squared row spacer 10 including a support member 12 attached perpendicular to two parallel elongate arms 14 and 16. Each arm of the row spacer 10 has markings affixed thereto.

For example, in FIG. 1A, the row spacer 10 has colored strip markings affixed horizontal to the longitudinal axis of each arm 14 and 16. The colored strip markings 18, 20, 22 and 24 on the lower arm 14 indicate the spacing of rows of tomato, corn, carrot and lettuce seed rows, respectively. Corresponding colored markings 26, 28, 30 and 32 are affixed to the upper arm 16 juxtaposed to colored strips 18, 20, 22 and 24, respectively.

Accurate spacing of seed rows is accomplished by stretching a seed spacer between juxaposed markings affixed to the row spacer. A seed spacer 34 is an extended cord or stick (FIG. 1B). The seed spacer 34 may be bounded on its ends by a first pole 36 and a second pole 38. The seed spacer 34 has colored strips 40, 42, 44 and 46 corresponding to the colored strips on the row spacer 10 and affixed horizontal to the longitudinal axis of the seed spacer 34 to indicate seed spacing within a row. The spacing of matching colored strips on the seed spacer corresponds to the optimum spacing of a particular type of seed within a row.

In one embodiment incorporating a row spacer and colored strip markings, the row spacer is placed on the soil in the desired position. Next, the first pole of the seed spacer is placed in the soil adjacent to a colored strip on the row spacer. For example, the first pole 36 is placed in the soil adjacent to the leftward colored strip 18 on the row spacer lower arm 14. A straight row of seeds is marked by stretching the seed spacer 34 parallel to the row spacer support member 12 and placing the second pole 38 into the soil adjacent to the leftward colored strip 26 on the row spacer upper arm 16. The seed spacer will extend between the juxtaposed colored strips on the row spacer and mark a straight row for planting seeds. The colored strips on the seed spacer 34 are then used to evenly space the seeds within this row.

When the seed spacer 34 is placed adjacent to the soil, the matching colored strips on the seed spacer indicate the placement of a particular type of each seed within a row. The marking strips on the row spacer and the seed spacer are coordinated such that similar colors or geometric figures refer to similar seed types throughout. Thus, if colored strips 18 and 26 on the row spacer indicate tomato seed row spacing, corresponding colored strips 40, 48, and 50 on the seed spacer mark the placement of tomato seeds within the row.

Of course, it will be appreciated that the row spacer is an optional element of the planting apparatus. Seed rows may be planted singularly, in which case row spacing is nonexistent, or row spacing may be altered by soil characteristics. However, use of a row spacer may be preferred when the apparatus is used by children.

Creation of a hole for planting each type of seed at the ideal depth is accomplished with the use of a dibble 62 (FIG. 1C). An optional embodiment of the dibble 62 includes an elongated cylindrical stem 64 with a first end 66 and a second end 68. An abbreviated cylindrical bar 70 is affixed to the stem 64 at preselected first distance from the first end 66. The bar 70 has a first surface 72 and an opposing surface 74. Markings are affixed to the first and second end of the dibble to indicate which end is depressed into the soil for a particular type of seed.

A hole is made in the soil by depressing the dibble 62 into the soil until a surface of the bar 70 is adjacent to the soil. Thus, to make a hole in the soil of the desired depth for tomato seeds and at the desired placement within a tomato seed row, the dibble is placed with the end of the dibble having the marking for a tomato seed placed adjacent to a colored strip on the seed spacer corresponding to tomato seeds. The dibble is then depressed until a surface of the dibble bar 70 is adjacent to the ground.

In an alternative embodiment, as shown in FIG. 3, a dibble 87 can take the form of a single, elongated stem with markings affixed horizontal to its longitudinal axis. The horizontal dibble markings indicate the depth at which the dibble is depressed into the soil for each particular seed type.

Referring to FIG. 1, the dibble 62 has a colored strip marking 73 affixed to the first end 66 of the dibble stem. The dibble colored strip marking 73 corresponds to colored strip markings affixed to the seed spacer and the row spacer. Thus, if colored strips 18 and 26 on the row spacer indicate tomato seed row spacing, corresponding seed spacer colored strips 40, 48, and 50 mark the placement of tomato seeds within the row, and the corresponding dibble colored strip 73 indicates preferred planting depth for tomato seeds.

The tomato seed hole is created by placing the first end 66 of the dibble 62 adjacent to the leftward seed spacer colored strip 40. The dibble is then depressed into the soil until the first surface 72 of the bar 70 is resting on the ground. In this manner, the stem 64 creates a hole in the soil at the preferred depth for planting tomato seeds. The dibble is then withdrawn from the soil and a tomato seed is dropped into the hole. The seed is covered with dirt. The planting process is continued for the remaining seeds and rows in a garden.

Markings on seed packaging may also be coordinated with the dibble, seed spacer and row spacer markings. The addition of appropriate figures on each type of seed package and properly placed corresponding figures on the row spacer, seed spacer and dibble provides a complete apparatus for easily planting a complete home garden. For example, the seed packaging 75 (FIG. 1D) includes a marking 77 corresponding to the row spacer markings for cherry tomatoes, the seed spacer markings for cherry tomatoes and the dibble marking for cherry tomatoes.

In an alternative embodiment, a seed strip is attached to the seed spacer. As illustrated in FIG. 2, a seed strip 76 is removably attached to one end of a seed spacer 78. The seed strip 76 is constructed of a biodegradable or other suitable cord 80 with seeds 82 and 84 affixed thereon. The distance between the seeds 82 and 84 approximates the distance the cord must extend downward and upward into and out of a hole when a seed is planted, plus the distance on top of the soil between holes.

The seed spacer 78 of FIG. 2 has geometric figures affixed to its longitudinal axis in contrast to the colored strips of the seed spacer 34 of FIG. 1. Corresponding geometric figures are placed on a row spacer 85 and the dibble 87 to mark the ideal row spacing and seed planting depth for corresponding seed types throughout (FIGS. 3A and 3B). Thus, a carrot figure on a row spacer, a seed spacer or a dibble would correspond to the dimensions for planting carrot seeds throughout.

In yet another alternative embodiment, a marked seed strip may be bounded by poles to function as a seed spacer. A seed strip/spacer 86, as illustrated in FIG. 3A, is marked with geometric figures and loosely affixed to two poles. As in FIG. 2, the distance between the seeds on the seed strip/spacer approximates the distance the cord must extend downward and upward into and out of a hole when a seed is planted, plus the distance on top of the soil between holes. The distance between each seed strip/spacer marking and the closest seed approximates the ideal planting depth.

To use the seed strip/spacer 86, the first pole 36 and the second pole 38 are placed in the soil. Next, the cord 80 is placed on the soil between the two poles 36 and 38 with the excess cord gathered adjacent to the remote pole 38. The user examines the strip markings to determine the type of marking or geometric figure affixed to the strip. A dibble, such as the dibble 87 in FIG. 3B, is placed on the cord to the right of a marking 94 on the seed strip closest to the near pole. Then, while holding the marking 94 on top of the soil, the dibble 87 and cord are depressed into the soil until the dibble marking corresponding to the markings on the seed strip/spacer 86 is adjacent to the top of the soil. This action forces the portion of the seed strip to the right of the seed strip/spacer marking 94 into the soil. The dibble is then withdrawn from the soil and the hole is covered with dirt. As each seed is planted, the excess cord is slowly drawn from the gathering adjacent to the remote pole.

The row spacer may also be embodied in a plurality of forms. FIG. 3A illustrates the use of a rectangular soil container for the row spacer 85. When a container is used as a row spacer, colored strip or geometric markings are placed on the rims of parallel sides of the container walls to indicate spacing between seed rows. Thus, the row spacer 85 has geometric figures affixed to the rims of the container walls in juxtaposed positions along its short sides. The container is first filled with soil and then a garden is planted using a seed spacer and dibble.

Although described for purposes of clarity with regard to specific preferred methods, the present invention is not limited to those embodiments but rather is applicable broadly to all versions falling within the scope and spirit of the appended claims. For example, string, thread, rope, cable, wire, twine or ribbon may be used to embody the cord 80 of the seed strip 76 and the cord of the strip/spacer 86.

I claim:

1. A method of planting seeds in soil with a marked dibble, a marked seed spacing means and a marked row spacing means, the seed spacing means having two ends, and matching dibble markings, seed spacing means markings and row spacing means markings corresponding to a particular type of seed, comprising the steps of:

determining seed row spacing by placing one end of the seed spacing means adjacent to a first marking on one side of the row spacing means and the other end of the seed spacing means adjacent to a matching second marking juxtaposed opposite the first marking on the other side of the row spacing means;

determining seed spacing by placing a seed on the soil adjacent to a matching marking on the seed spacing means; and pushing the dibble into the soil to a depth determined by a matching marking on the dibble.

2. A seed planting device, comprising:

a dibble having a first end, the dibble having a marking with a characteristic for identifying a particular type of seed, the marking located a spaced distance from the first end of the dibble corresponding to the preferred depth at which the type of seed is to be planted;

a seed spacing means, the seed spacing means having at least two matching markings thereon for defining the spacing between the particular type of seed;

the markings on the seed spacing means having a characteristic corresponding to the characteristic of the marking on the dibble;

a row spacing means, the row spacing means having at least one marking thereon for determining the spacing between seed rows; and the marking on the row spacing means having a characteristic corresponding to the characteristic of the marking on the dibble.

3. The planting device of claim 2 wherein:
the row spacing means marking is a colored strip corresponding to a particular type of seed.

4. The planting device of claim 2 wherein:
the row spacing means marking is a geometric figure corresponding to a particular type of seed.

5. The planting device of claim 2 wherein:
the row spacing means is a container having at least two substantially parallel sides and adapted to contain garden soil.

6. The planting device of claim 2 which further comprises:

a second marking on the dibble with a characteristic for identifying a second particular type of seed, the second marking located a spaced distance from the first end of the dibble corresponding to the preferred depth at which the second type of seed is to be planted;

at least two second matching markings on the seed spacing means for defining the spacing between the second type of seeds;

the second matching markings on the seed spacing means having a characteristic corresponding to the characteristic of the second marking on the dibble;

a second marking on the row spacing means; and the second marking on the row spacing means having a characteristic corresponding to the characteristic of the second marking on the dibble.

7. A seed planting device, comprising:

a dibble having a first end, the dibble having a marking with a characteristic for identifying a particular type of seed, the marking located a spaced distance from the first end of the dibble corresponding to the preferred depth at which the type of seed is to be planted;

a seed spacing means, the seed spacing means having at least two matching markings thereon for defining the spacing between the particular type of seed; and the markings on the seed spacing means having a characteristic corresponding to the characteristic of the marking on the dibble;

a row spacing means, the row spacing means having at least one marking thereon for determining the spacing between seed rows;

the marking on the row spacing means having a characteristic corresponding to the characteristic of the marking on the dibble;

a seed package, the seed package having at least one marking thereon for identifying the type of seeds within the package; and the marking on the seed package having a characteristic corresponding to the characteristic of the marking on the dibble.

8. A seed planting device, comprising:

a dibble having a first end, the dibble having a marking with a characteristic for identifying a particular type of seed, the marking located a spaced distance from the first end of the dibble corresponding to the preferred depth at which the type of seed is to be planted;

a seed spacing means, the seed spacing means having at least two matching markings thereon for defining the spacing between the particular type of seed;

the markings on the seed spacing means having a characteristic corresponding to the characteristic of the marking on the dibble; and at least one seed strip affixed to the seed spacing means, the seed strip comprising:
 a biodegradable cord; and
 a plurality of seeds affixed to the cord at predefined spacing along the cord.

9. A seed planting device, comprising:

a dibble having a first end, the dibble having a marking with a characteristic for identifying a particular type of seed, the marking located a spaced distance from the first end of the dibble corresponding to the preferred depth at which the type of seed is to be planted;

a seed spacing means, the seed spacing means having at least two matching markings thereon for defining the spacing between the particular type of seed;

the markings on the seed spacing means having a characteristic corresponding to the characteristic of the marking on the dibble; and the seed spacing means comprising:
 a seed strip, the seed strip comprising,
  a biodegradable cord;
  a plurality of seeds affixed to the cord at predefined spacing along the cord;
  the cord having at least two markings thereon for defining the spacing between seeds; and
  the markings on the cord having a characteristic corresponding to the dibble marking characteristic.

* * * * *